United States Patent

Sobol

[11] Patent Number: 5,854,859
[45] Date of Patent: Dec. 29, 1998

[54] IMAGE SHARPENING FILTER PROVIDING VARIABLE SHARPENING DEPENDENT ON PIXEL INTENSITY

[75] Inventor: Robert E. Sobol, Fort Collins, Colo.

[73] Assignee: Hewlett-Packard Company, Palo Alto, Calif.

[21] Appl. No.: 775,068

[22] Filed: Dec. 27, 1996

[51] Int. Cl.⁶ .................................................. G06T 5/00
[52] U.S. Cl. ............................................ 382/261; 382/263
[58] Field of Search ................................. 382/260, 261, 382/263, 266, 269, 254; 358/447

[56] References Cited

U.S. PATENT DOCUMENTS 4,568,977  2/1986  Chamberlain et al. .
5,113,365  5/1992  Yang .......................................... 364/807
5,343,283  8/1994  Dorsselaer et al. ....................... 358/455
5,481,628  1/1996  Ghaderi ..................................... 382/261

*Primary Examiner*—Scott Rogers
*Attorney, Agent, or Firm*—Augustus W. Winfield

[57] ABSTRACT

An automatic level-sensitive Laplacian filter for image processing. Laplacian filter coefficients and normalization divisors are made a function of intensity on a pixel by pixel basis. Pixels indicating a high intensity may be greatly changed by neighboring pixels. Pixels indicating a low intensity receive relatively little or no filtering. In a specific example embodiment, the intensity range is divided into bands, with a different filter for each band. The resulting images are visually sharpened (edge enhanced) with very little impact in darker areas of the image.

6 Claims, 2 Drawing Sheets

IMAGE SHARPENING FILTER PROVIDING VARIABLE SHARPENING DEPENDENT ON PIXEL INTENSITY

FIELD OF INVENTION

This invention relates generally to computerized image processing and more specifically to spatial filtering, kernel operations and Laplacian operators.

BACKGROUND OF THE INVENTION

Digital cameras, image scanners, copiers, facsimile machines and other devices provide images in an electronic form suitable for transmission, printing or storage. Picture elements (pixels) are represented numerically as intensity values or coordinates in a color space. Once images are acquired in computer readable form, they may be "processed" to remove distortions, to reduce noise, to modify color, to accentuate outlines, and so forth. This patent document is primarily concerned with spatial filters, also called kernel operations or convolution kernels. Of specific interest are Laplacian operators, also called sharpening filters. With Laplacian operators, pixel values may be modified by the values of neighboring pixels. With uniform intensity, no modification occurs. However, in areas of changing intensity, the Laplacian operation results in an exaggeration of the change. Laplacian operators may be viewed as spatial differentiators, or spatial high-pass filters. Visually, they improve image contrast at edges, making edges easier for the viewer to see, making an image appear sharper. For a general tutorial overview of image processing, see, for example, Ross, John C., *The Image Processing Handbook,* 2nd Edition (1995), CRC Press, Inc. Laplacian operators are discussed in Ross at pages 225–232.

Images obtained by digital cameras and image scanners generally have some unavoidable noise. Photosensors have a finite background signal level even when no light is received by the photosensors (sometimes called fog level or dark current). There may be thermal noise, synchronous electronic noise, and quantization banding due to limited precision in analog-to-digital conversion. Also, sensitivity (voltage change/light intensity) varies from photosensor element to photosensor element. In general, digital cameras and image scanners perform calibration processes to reduce the effects of background (dark) signals and variable sensitivity, but calibration rarely completely eliminates variability.

The sensitivity of the human visual system to light intensity is approximately logarithmic. That is, the human visual system is very sensitive to intensity changes in dark areas and shadow areas and the sensitivity to intensity change decreases with increasing intensity. Therefore, for a fixed level of noise, the noise is visually more apparent in the dark areas of an image. For example, in a line scanner, if one photosensor element within a row of photosensitive elements is more sensitive than neighboring photosensor elements, the resulting digitized image may have a light vertical line. This line may not be visible in light areas of the image but may be visible and objectionable in the darker areas of an image. However, sensitivity to spatial detail decreases with decreasing intensity. Therefore, low-pass filtering of an image can suppress some objectional noise in the darker areas of the image with relatively little visual impact on the spatial detail in the darker areas.

A Laplacian operator, while providing useful edge enhancement in light areas of an image, also accentuates noise in the dark areas of an image. For example, a light vertical line, as described above, might not be visible in a dark area before application of the Laplacian operator but may be made visible by application of the Laplacian operator. Similarly, a gray area having a relatively smooth appearance before application of a Laplacian operator may appear non-uniform or noisy after application of the Laplacian operator.

There is a need for image sharpening without accentuating noise in the dark areas of the image.

SUMMARY OF THE INVENTION

An automatic filtering operation is provided in which the degree of sharpening is made a function of intensity on a pixel by pixel basis. For each pixel, the central filter coefficient and the normalization divisor are made a function of intensity. Pixels with low intensity receive relatively little or no filtering. That is, for pixels in dark areas, the influence of neighboring pixels is relatively small. Pixels with higher intensity receive relatively more filtering. In a specific example embodiment, the intensity range is divided into bands, with a different filter for each band. The resulting images are visually sharpened (edge enhanced) with very little impact in darker areas of the image.

DETAILED DESCRIPTION OF THE PREFERRED EMBODIMENT OF THE INVENTION

Figure 1A:
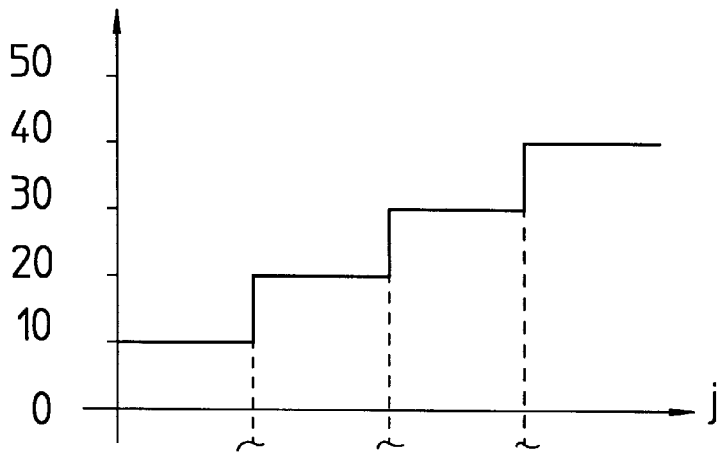
FIG. 1A is a graph of pixel value versus pixel number for an example row of pixels.

The following array of numbers represents pixel values $P(i,j)$ in a two dimensional image. Assume for illustration that pixels having low numerical values are dark and pixels having high numerical values are light. FIG. 1A is a graph of row number 2 ($i=2$) as a function of column number (j).

```
i = 1    10 10 10 10 ▓▓ 20 20 20 30 30 30 30 40 40 40
i = 2    10 10 10 ▓▓▓▓▓▓ 20 20 30 30 30 30 40 40 40
i = 3    10 10 10 10 ▓▓ 20 20 20 30 30 30 30 40 40 40
j =       1  2  3  4  5  6  7  8  9 10 11 12 13 14 15
```

In the following example, Laplacian filters are a matrix of coefficients having the following general form:

$$\begin{matrix} & -1/K & \\ -1/K & (K+4)/K & -1/K \\ & -1/K & \end{matrix}$$

For each pixel $P(i,j)$, the computation is as follows:

$$P(i,j) = [(K+4) * P(i,j) - P(i+1,j) - P(i,j-1) - P(i,j+1) - P(i-1,j)]/K$$

For example, consider P(2,5) highlighted above and K=2.

$$P(2,5) = [6*P(2,5) - P(1,5) - P(2,4) - P(2,6) - P(3,5)]/2$$
$$= [120 - 20 - 10 - 20 - 20]/2 = 25$$

As a result of applying the Laplacian operation, the value of P(2,5) is changed from 20 to 25. The following numbers represent row 2 above after application of a fixed Laplacian operator with K=2 (the edge pixels are not filtered).

$i = 2$  10 10 10 5 25 20 20 15 35 30 30 25 45 40 40

$j =$  1 2 3 4 5 6 7 8 9 10 11 12 13 14 15

Figure 1B:
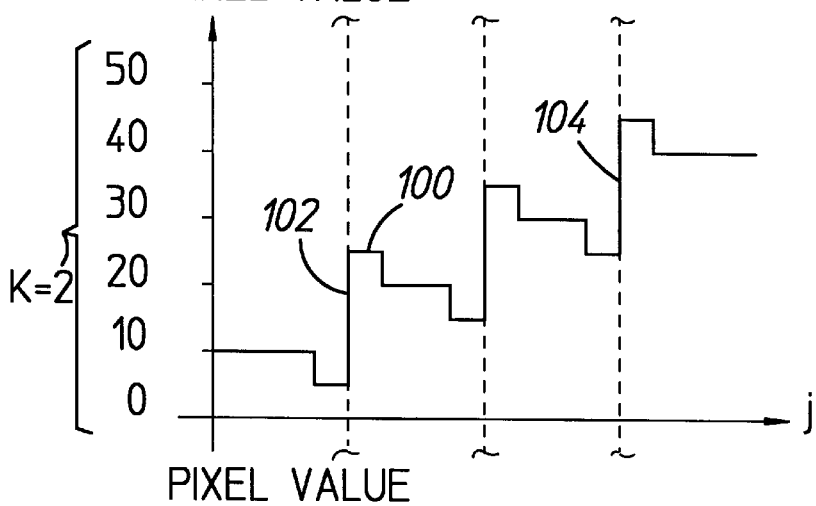
FIG. 1B is a graph of the pixel values of FIG. 1A as modified by a fixed Laplacian operator.

FIG. 1B is a graph of row number 2 above after application of a fixed Laplacian operator with K=2. Reference number 100 in FIG. 1B designates P(2,5) used for the above numerical example. Note that steps in intensity in the original image (FIG. 1A) result in an undershoot followed by an overshoot in the filtered image (FIG. 1B). As a result, steps in intensity having an increment of 10 in FIG. 1A have an increment of 20 in FIG. 1B. That is, intensity steps or edges or boundaries are exaggerated. Note in FIG. 1B that steps between numerical pixel values of 10 and 20 (reference number 102) are exaggerated exactly the same amount as steps between numerical pixel values of 30 and 40 (reference number 104). Since the human visual system is logarithmic, the exaggerated intensity step 102 in a relatively dark area will appear to be much greater than the exaggerated intensity step 104 in a relatively light area.

Laplacian operations are destructive, so a copy of each original numerical pixel value must be stored long enough to ensure that the computation is performed on original pixel values, not modified pixel values. In addition, special rules are required for the outer edges of the image, by creating artificial boundaries or by choosing to not perform the filtering operation for pixels adjacent to a boundary.

In a specific example embodiment below, values of K are 1, 2, 4 and 8. With K=8, a pixel value is changed relatively little by neighboring pixels (weak filter). With K=1, a pixel value may be changed substantially by neighboring pixels (strong filter). Choosing integral powers of two for K enables the normalizing division by K to be performed by a microprocessor shift instruction.

In the invention, for each pixel being filtered, the value of K is dependent on the numerical value of the pixel before filtering. For example, consider the following relationships:

If $P(i,j) \leq 10$ then K=8
If $10 < P(i,j) \leq 20$ then K=4
If $20 < P(i,j) \leq 30$ then K=2
If $30 < P(i,j) \leq 40$ then K=1

The following numbers represent original row 2 above after application of a variable Laplacian operator with K=1, 2, 4 or 8 according to the above example relationships (the edge pixels are not filtered).

$i = 2$  10 10 10 9 22 20 20 18 35 30 30 25 50 40 40

$j =$  1 2 3 4 5 6 7 8 9 10 11 12 13 14 15

Figure 1C:
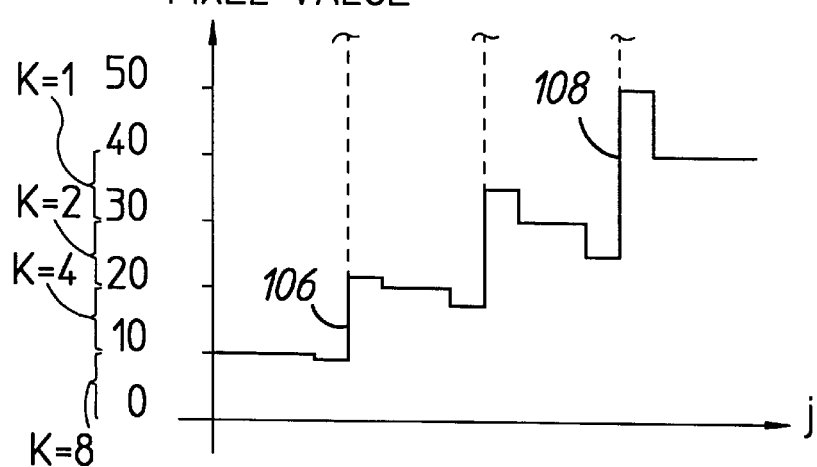
FIG. 1C is a graph of the pixel values of FIG. 1A as modified by a variable Laplacian operator in accordance with the invention.

FIG. 1C is a graph of original row 2 above after application of a variable Laplacian operator with K=1, 2, 4 or 8 according to the above relationships. Note that steps in intensity in the darker areas (106) are barely exaggerated whereas steps in the lighter areas (108) are greatly exaggerated. For many images, application of a variable Laplacian operator as illustrated above results in a perceptible improvement in sharpness without accentuating noise in the dark areas of the image.

In a specific example embodiment of the invention, an operator of an imaging device is permitted to select from a range of sharpening filters called light, normal, heavy and extra heavy, corresponding to K=8, 4, 2 and 1 respectively. The original intensities from the photosensors are modified by a logarithmic function to approximate the human visual response (called Gamma correction). The thresholds are set at specific levels in the Gamma corrected intensity range. For example, for a Gamma corrected intensity range of 0–255, where 0 is dark and 255 is high intensity, thresholds may be set at 20, 40, 60 and 80. The relationship between individual Gamma corrected pixel intensity and filter value is then as follows:

If $80 \leq P(i,j)$ then use the operator selected filter weight.

If $60 \leq P(i,j) < 80$ then use the filter weight one step lighter than operator selected filter weight.

If $40 \leq P(i,j) < 60$ then use the filter weight two steps lighter than operator selected filter weight.

If $20 \leq P(i,j) < 40$ then use the filter weight three steps lighter than operator selected filter weight.

That is, the operator selected weight is used for the highest intensity Gamma corrected intensity values, the next lightest filter (or none) is used for the next darker 20 Gamma corrected intensity values, and so forth. For example, if the operator selects normal filtering, the highest intensities are filtered with K=4, the next darker 20 intensities are filtered with K=8, and the darkest 60 intensities are not filtered at all.

For color, the above variable filter approach may be used on each color coordinate if appropriate (for example, red, green, blue) or may be used on just the intensity coordinate for color spaces having a separate coordinate equivalent to intensity. For example, in a hue, saturation, lightness color space, variable filters may be applied to the lightness coordinate only.

Laplacian filters may have diagonal elements. They may be larger than three by three. They may be combined with other filters to provide low pass filtering before sharpening or to provide other processing combined with sharpening. A sharpened image may be subtracted from an original image to "unblur" an image.

Figure 2:
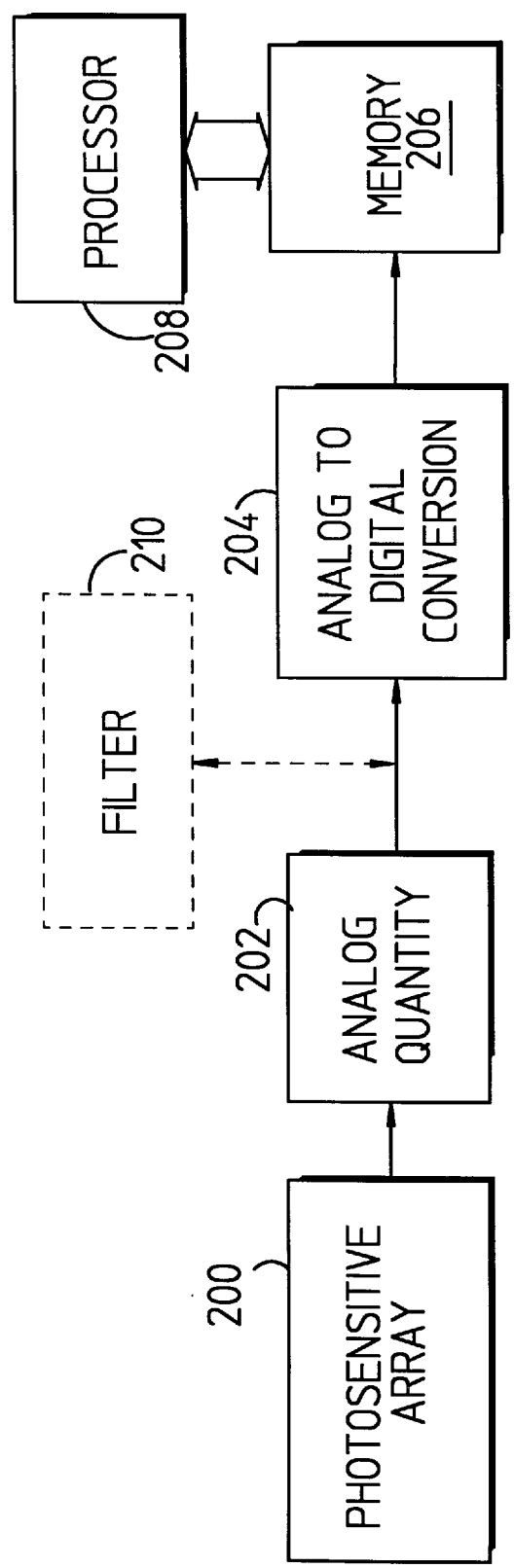
FIG. 2 is a block diagram of an imaging device.

FIG. 2 is a block diagram of an imaging device such as a digital camera, copier, or scanner. An array of photosensitive devices 200 provides analog quantities (charges, voltages or currents) 202 that are measures of light intensity impinging on each photosensitive device for a specific amount of time. Typically, the analog quantities 202 are directly converted into numerical values by one or more analog-to-digital converters 204 and stored in a memory 206. Then, the numerical values may be filtered or otherwise processed by a processor 208. Instead of processing the numerical values, it is also possible to directly process analog quantities, as depicted by filter 210. See, for example, U.S. Pat. Nos. 4,568,977 and 5,113,365. Therefore, with suitable intermediate storage and thresholding devices (analog comparators), a level sensitive Laplacian operator as discussed above may be implemented in the analog domain by filter 210. Alternatively, a level sensitive Laplacian operator may be implemented in the digital domain by processor 208. Processor 208 may be internal to a peripheral device attached to a computer or may be in a separate computer.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of spatially filtering an array of pixel values, where each pixel value is a measure of light intensity of an image, the method comprising the following steps:

(a) defining at least one threshold;
   (b) defining first and second Laplacian filters:
   (c) reading a pixel value;
   (d) determining whether the pixel value is greater than the threshold;
   (e) applying the first Laplacian filter to the pixel value when it is determined in step (d) that the pixel value is greater than the threshold and otherwise applying the second Laplacian filter to the pixel value, the choice of applying the first or second Laplacian filter determined solely by the outcome of step (d); and
   (f) repeating steps (c) through (e) for all pixels in the array.

2. The method of claim 1 where each pixel value is an analog quantity.

3. The method of claim 1 where each pixel value is a numerical value.

4. A method of spatially filtering an array of pixel values, where each pixel value is a measure of light intensity of an image, the method comprising the following steps:

(a) defining at least one pixel value threshold corresponding to a light intensity threshold;
   (b) defining first and second Laplacian filters, the first Laplacian filter exaggerating a spatial step in pixel values less than the second Laplacian filter exaggerates the spatial step in pixel values;
   (c) reading a pixel value;
   (d) applying the second Laplacian filter to the pixel value when the pixel value corresponds to a light intensity that is greater than the light intensity threshold;
   (e) applying the first Laplacian filter to the pixel value when the pixel value corresponds to a light intensity that is less than the light intensity threshold; and
   (f) repeating steps (c) through (e) for all pixels in the array.

5. The method of claim 4 where each pixel value is an analog quantity.

6. The method of claim 4 where each pixel value is a numerical value.

* * * * *